US008682708B2

(12) United States Patent
Cerminaro

(10) Patent No.: US 8,682,708 B2
(45) Date of Patent: Mar. 25, 2014

(54) REPUTATION RISK FRAMEWORK

(75) Inventor: John A. Cerminaro, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 396 days.

(21) Appl. No.: 12/608,277

(22) Filed: Oct. 29, 2009

(65) Prior Publication Data

US 2011/0106578 A1 May 5, 2011

(51) Int. Cl.
G06Q 10/00 (2012.01)
(52) U.S. Cl.
USPC .......................................... 705/7.28; 705/7.38
(58) Field of Classification Search
USPC ................................................ 705/7.28, 7.38
See application file for complete search history.

(56) References Cited

U.S. PATENT DOCUMENTS

| 6,895,383 | B2* | 5/2005 | Heinrich | 705/7.28 |
|---|---|---|---|---|
| 7,359,865 | B1* | 4/2008 | Connor et al. | 705/7.28 |
| 7,792,694 | B2* | 9/2010 | Jamil et al. | 705/7.28 |
| 7,937,761 | B1* | 5/2011 | Bennett | 726/23 |
| 8,020,210 | B2* | 9/2011 | Tippett et al. | 726/25 |
| 2004/0015376 | A1* | 1/2004 | Zhu et al. | 705/7 |
| 2004/0111353 | A1* | 6/2004 | Ellis et al. | 705/36 |
| 2004/0128189 | A1* | 7/2004 | Hirano et al. | 705/11 |
| 2004/0221176 | A1* | 11/2004 | Cole | 713/201 |
| 2006/0100957 | A1* | 5/2006 | Buttler et al. | 705/38 |
| 2006/0116898 | A1* | 6/2006 | Peterson | 705/1 |
| 2006/0155553 | A1* | 7/2006 | Brohman et al. | 705/1 |
| 2006/0156407 | A1* | 7/2006 | Cummins | 726/25 |
| 2006/0218019 | A1* | 9/2006 | Reis | 705/4 |
| 2006/0277080 | A1* | 12/2006 | DeMartine et al. | 705/7 |
| 2008/0015469 | A1* | 1/2008 | Morton et al. | 600/573 |
| 2008/0077474 | A1* | 3/2008 | Dumas et al. | 705/10 |
| 2008/0134145 | A1* | 6/2008 | Halcrow et al. | 717/124 |
| 2008/0140514 | A1* | 6/2008 | Stenger | 705/10 |
| 2008/0154679 | A1* | 6/2008 | Wade | 705/7 |
| 2008/0288330 | A1* | 11/2008 | Hildebrand et al. | 705/10 |
| 2009/0077666 | A1* | 3/2009 | Chen et al. | 726/25 |
| 2011/0054968 | A1* | 3/2011 | Galaviz | 705/7.28 |
| 2011/0077950 | A1* | 3/2011 | Hughston | 705/1.1 |

OTHER PUBLICATIONS

Evans, .G and Bentons S. "The BT Risk Cockpit—a visual approacth to ORM." BT Technology Journal, vol. 25, No. 1, Jan. 2007.*
Immaneni, Aravind, Mastro, Chris and Haubenstock, Michael. "A Structed Approach to Building Predictive Key Risk Indicators." Operational Risk: A Special Edition of the RMA Journal, May 2004.*

(Continued)

Primary Examiner — Andre Boyce
Assistant Examiner — Renae Feacher
(74) Attorney, Agent, or Firm — Banner & Witcoff, Ltd.; Michael A. Springs

(57) ABSTRACT

A risk framework is described for computing risk. One or more persons may be grouped into classes of stakeholders. Different types of risk may be classified into risk categories. Within each risk category, events contributing to that type of risk may be determined and assigned a weight/severity value and a likelihood of occurrence value. Risk likelihood may be computed for each risk category by summing the products of weight/severity value and likelihood of occurrence value for each event within the risk category. A severity level may be determined and assigned with respect to each class of stakeholders regarding the risk categories, and a risk score may be computed for each stakeholder class and risk category combination. An aggregate risk likelihood may be computed by summing and/or weighting the risk likelihoods computed for each risk category.

16 Claims, 6 Drawing Sheets

(56) References Cited

OTHER PUBLICATIONS

Kartalia, Jim. Risk Management, Jul. 1, 2000, vol. 47, No. 7 (Jul. 2000), p. 51-56 , Database: ProQuest Central.*

Schanz, Kai-uwe. n.d. "Reputation and Reputational Risk Management." vol. 31, No. 3 (Jul. 2006), p. 377-381, EBSCOhost (accessed Oct. 30, 2013). Chicago/Turabian: Humanities Bibliography.*

Veysey, Sarah, Reputation Risk Needs Managing, Business Insurance 34.25 (Jun. 19, 2000):21-22.*

Loeb, Harlan,"Reputation Key to Risk Management," PRweek, US ed. 10.18 (May 7, 2007): 10.*

Kewell, Beth, "Linking Risk and Reputation: A Research Agenda and Methodological Analysis," Risk Management (2007) 9, 238-254.*

Ingley, Coral and Van Der Walt, Nick, "Risk Management and Board Effectiveness," Int. Studies of Mgt. & Org., vol. 38, No. 3, Fall 2008, pp. 43-70.*

Olander, Stefan, "Stakeholder impact analysis in construction project management," Construction Management and Economics (Mar. 2007) 25, 277-287.*

* cited by examiner

Non-compliance w/ regulations (402)

Security/Privacy Breaches (408)

Lack of Quality (414)

Poor Crisis Management (420)

Failure to Hit Targets (426)

Poor Associations (432)

Failure to Address Issues of Public Concern (438)

Labor Unrest (444)

*FIG. 4*

| RISK CATEGORIES | TR | LH | WGT | RISK # | Customers (202') | Associates (208') | Community (214') | Sharehldrs (220') | Regs (226') | Partner (232') |
|---|---|---|---|---|---|---|---|---|---|---|
| Non-compliance w/ regulations (402) | ↔ | 2 | .3 | .6 | .3 | .4 | .5 | .7 | .8 | .9 |
| Security/Privacy Breaches (408) | ↔ | 3 | .3 | .9 | .5 | .1 | 1.1 | .7 | .6 | 2.4 |
| Lack of Quality (414) | ↔ | 2 | .2 | .4 | .1 | .1 | .7 | .2 | .5 | .8 |
| Poor Crisis Management (420) | ↔ | 1 | .3 | .3 | .7 | .2 | .1 | .4 | .3 | .1 |
| Failure to Hit Targets (426) | ↔ | 3 | .8 | 2.4 | 3.2 | 1.1 | 2.9 | 3.8 | .1 | 3.3 |
| Poor Associations (432) | ↔ | 2 | .2 | .4 | .1 | .5 | .8 | .2 | .1 | .7 |
| Failure to Address Issues of Public Concern (438) | ↔ | 4 | .9 | 3.6 | 3.6 | 3.6 | 3.9 | 3.3 | 3.8 | 3.4 |
| Labor Unrest (444) | | 1 | .6 | .6 | .7 | .5 | .5 | .8 | .5 | .6 |

REPUTATION RISK FRAMEWORK

FIELD

Aspects of the present disclosure relate to risk management. More specifically, aspects of the disclosure relate to computing, outputting, displaying, and assessing reputational risk based on one or more events and conditions and allocating resources to respond to potential and realized risk.

BACKGROUND

In a business context, reputational risk relates to how people perceive a given business, or more specifically, the range of potential perceptions. The concept of reputational risk is understood, and most financial institutions and businesses have an approach for developing a perspective on their degree of reputation risk.

Conventional techniques for assessing risk are based on theoretical or qualitative methodologies. The conventional techniques excessively emphasize managerial judgment. Most methodologies lack a high degree of analytical rigor. Risk tolerance is often established on an ad hoc basis, with limited consistency across operations or business units. Furthermore, reputation risk tends to be viewed as a one dimensional issue associated with discrete actions taken by a target company. A lack of integration with respect to all the various inputs into the decision making processes results in ill-conceived and incomplete managerial decisions. As a result, companies struggle to identify pragmatic solutions and outcomes for mitigating reputational risk.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects described herein are directed to an identification of risk categories. One or more managers, executives, officers, and the like (hereinafter officials) may classify risk into one or more categories. The categories may be based on historical importance to business reputation. Furthermore, weights may be applied to the categories to adjust for differences in relative impact. In some embodiments, one or more of the risk categories may be assigned a likelihood value. The likelihood value may be based on historical events, statistical averaging, and actuarial predictive models. The likelihood value may also be generated by one or more parties (e.g., governmental officials in conjunction with policy-making or legislation). A likelihood value may be updated or modified over time to reflect current environmental inputs or conditions.

Aspects described herein may relate to assigning persons to stakeholder classes. Risk may be assessed and analyzed from the perspective of one or more of the stakeholder classes. Baseline values for one or more of the risk categories may be assessed and modified with respect to one or more stakeholder classes.

Aspects described herein may relate to one or more process owners supplying additional perspective on risk values. The additional perspective may be applied based on a process overseen by a process owner. The additional perspective may also be applied to determine risk impact across the stakeholder classes.

Aspects described herein may relate to the generation of a heatmap. The heatmap may take the form of auditory sounds, a visual display, or some combination thereof. The heatmap may provide an indication of risk for one or more of the risk categories and stakeholder classes. The heatmap may provide the indication of risk based on current values/conditions. The heatmap may provide an indication of rates and degrees of change with respect to risk. For example, a first derivative calculation may be conducted to determine how quickly risk is changing. Similarly, a second derivative calculation may be conducted to determine risk maxima/minima. The heatmap may provide a forecast of risk and may associate a degree of confidence with the forecast.

BRIEF DESCRIPTION OF THE DRAWINGS

The present disclosure is illustrated by way of example and not limited in the accompanying figures in which like reference numerals indicate similar elements.

FIG. 4 illustrates a diagram of risk categories in accordance with aspects of the disclosure.

FIG. 6 illustrates a heatmap that may be used in accordance with one or more aspects of the disclosure.

DETAILED DESCRIPTION

Figure 1:
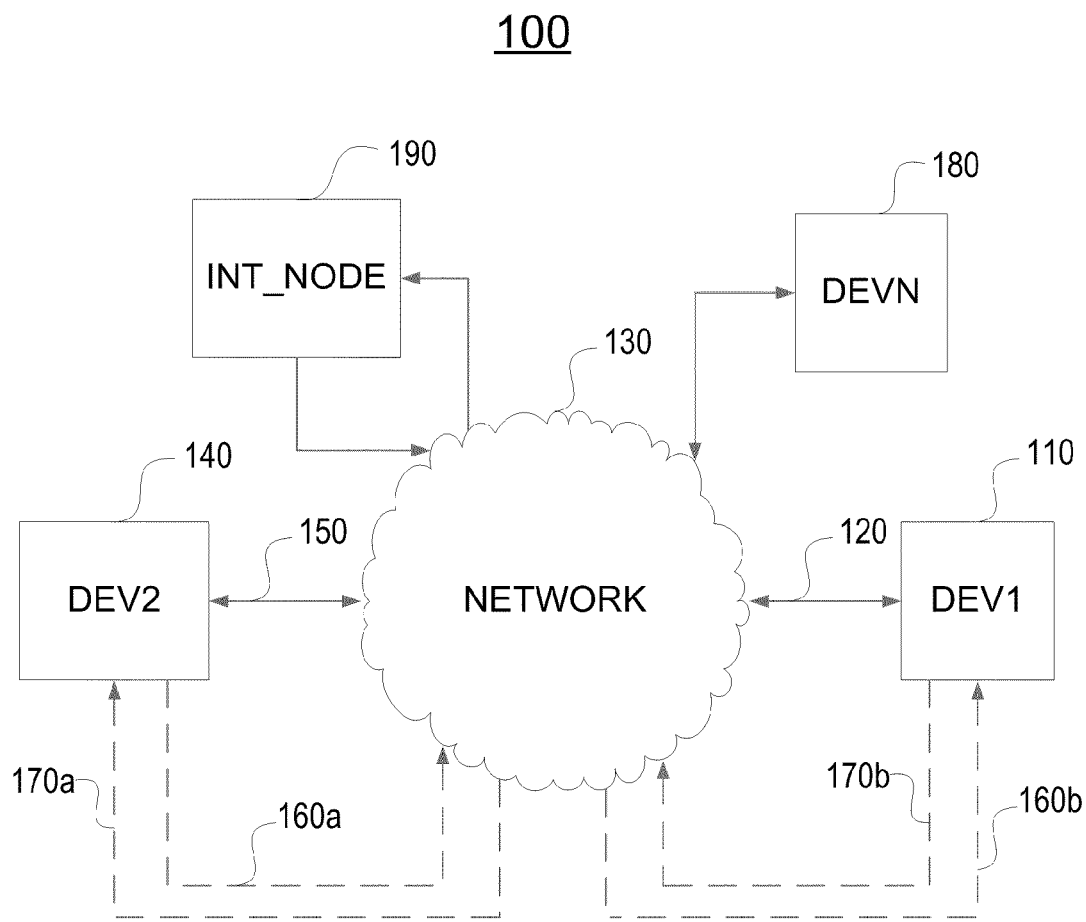
FIG. 1 illustrates a network computing environment in which various aspects of the disclosure may be implemented.

In accordance with various aspects of the disclosure, apparatuses, systems and methods are described for assessing risk. While largely stated in terms of reputational risk, the techniques and methodologies described herein may be adapted to accommodate other forms of risk assessment.

In some embodiments, risk assessment may be obtained in a manner ensuring analytical rigor and achieving consistent thresholds across business units. Elements of risk analysis and assessment may include a definitions phase, a governance phase, and an oversight and execution phase. With respect to a business or financial institution, the definitions phase may entail defining risk, determining categories of risk and classes of stakeholders, correlating events to (numerical) representations and assigning (relative) weights to the events. The governance phase may include identifying officials to enforce strategies to cope with risk areas identified by a heatmap. The oversight and execution phase may entail enforcing strategies to cope with risk areas identified by the heatmap. The strategies may be applied across business/financial units on a consistent basis. In some embodiments, the strategies may be modified to accommodate differences between the business/financial units.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect.

FIG. 1 illustrates a network computing environment 100 suitable for carrying out one or more aspects of the present disclosure. For example, FIG. 1 illustrates a first device DEV1 110 (e.g., a laptop, a PDA, a mobile station, a desktop computer, and the like) connected to a network 130 via a connection 120. Network 130 may include the Internet, an intranet, wired or wireless networks, or any other mechanism suitable for facilitating communication between computing platforms in general. FIG. 1 also depicts a second device DEV2 140 (e.g., a server) connected to network 130 via a connection 150. By virtue of the connectivity as shown, DEV1 110 and DEV2 140 may communicate with one another. Such communications may enable the exchange of various types of information. For example, the communications may include data to be exchanged between DEV1 110 and DEV2 140. Such data may include images, files, and the like. The communications may further include additional information such as control information.

Connections 120 and 150 illustrate interconnections for communication purposes. The actual connections represented by connections 120 and 150 may be embodied in various forms. For example, connections 120 and 150 may be hardwired/wireline connections. Alternatively, connections 120 and 150 may be wireless connections. Connections 120 and 150 are shown in FIG. 1 as supporting bi-directional communications (via the dual arrow heads on each of connections 120 and 150). Alternatively, or additionally, computing environment 100 may be structured to support separate forward (160a and 160b) and reverse (170a and 170b) channel connections to facilitate the communication.

Computing environment 100 may be carried out as part of a larger network consisting of more than two devices. For example, DEV2 140 may exchange communications with a plurality of other devices (e.g., DEVN 180) in addition to DEV 1 110. The communications may be conducted using one or more communication protocols. Furthermore, computing environment 100 may include one or more intermediary nodes (e.g., INT_NODE 190) that may buffer, store, or route communications between the various devices.

Figure 2:
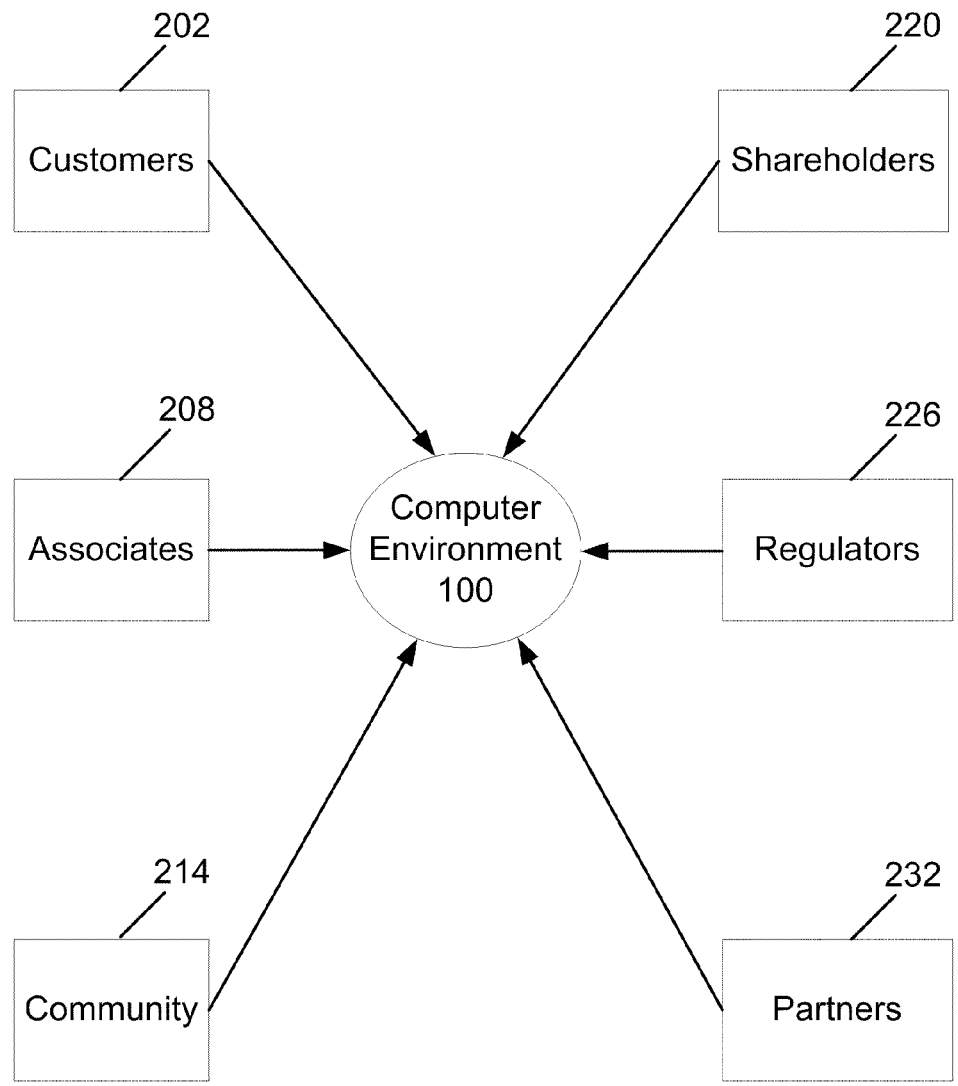
FIG. 2 illustrates an organization of stakeholder classes in accordance with aspects of the disclosure.

FIG. 2 illustrates an organization of stakeholder classes in accordance with aspects of the disclosure. The stakeholder classes may be related to one another and a business or company. FIG. 2 demonstrates an organization of stakeholders communicatively coupled or related to one another via network computing environment 100 of FIG. 1. In some embodiments, alternative communication or connection mechanisms may be used. For example, instead of the hub-and-spoke arrangement shown, the stakeholder classes may be arranged in a top-down manner, as part of a pyramid, as a ring, graph, and the like.

As illustrated, FIG. 2 includes a customer stakeholder class 202. Customers 202 may be the direct customers of a business/financial institution, or may be indirect customers of the business/financial institution (e.g., as a part of a distribution chain). In terms of evaluation criteria or factors, customers may emphasize product value or quality. For example, customers may demand that product produced by a business adheres to quality control standards, that product is consistent across lots or units, and that product is delivered in a timely fashion. Similar criteria may be applied to a provisioning of services as well.

Customers may be interested in customer service support. For example, a customer may hold a company or business in high regard if the customer does not have to wait on a telephone line for customer/client support personnel to take the customer's call. Customers may hold a company or business in high regard if the customer's problems/issues with a product are resolved in a timely manner or if, at the very least, the company/business takes a proactive approach in resolving the problem/issue.

Customers may be interested in having any information they share with a business or company to be withheld for purposes of privacy. For example, in the context of financial services, a customer may provide information related to date of birth, social security number, familial information (e.g., a name of a spouse), and the like to a bank. The bank may breach the customer's trust if the bank fails to maintain the customer's information in privacy (e.g., if the bank sells the customer's information to a third party business, or if the bank's security is easily breached).

FIG. 2 includes an associate stakeholder class 208. Associate class 208 may include employees, interns, and support staff of a business or company. In some embodiments, associate class 208 may include members of the board of directors and officers of the business/company.

Associates 208 may value fair treatment. For example, associates 208 may expect to receive open and honest communication from business/company officials regarding labor contracts, wage increases, employment details, and the like. Such expectations may be weighted in embodiments where, for example, the associates making up associate class 208 are organized as a labor union, wherein wages are generally bargained for on a collective basis.

Associates 208 may value business opportunities. For example, associates might have a negative opinion of a business/company that they work for if the business/company has a history of filling open positions from the outside, rather than promoting from within. Moreover, associates 208 may expect that the business/company would treat all candidates fairly or equally with respect to such open positions.

In addition to wages and benefits, associates 208 may value safe and friendly working conditions. For example, if a business/company has a poor track record with respect to workplace accidents, associates 208 may hold the business/company in a negative light. Similarly, if there is an inordinate amount of tension and/or competition amongst associates within associate class 208, the associates may hold such tension against the business/company, even if the business/company was not (even in any way) responsible for the creation or existence of such tension.

FIG. 2 includes a community (at large) stakeholder class 214. As the name implies, community class 214 may include schools, houses of worship (e.g., churches), charitable organizations, and any other association of community members, whether on a formal or informal basis.

Community class 214 may value a business/company taking responsibility for its actions. For example, if a business is involved in the shipping of oil across an ocean, and the business fails to take responsibility for an oil spill that it caused, community 214 may hold such a lack of accountability against the business. Failure on the part of the business to take responsibility may be a factor tending to harm the business's reputation.

As yet another example of a business taking corporate responsibility for its actions, community 214 may expect a business to act in a prudent manner with respect to its economic affairs and business dealings. Thus, for example, if a business accepts money from a governmental agency/entity, community 214 may anticipate that the business would adhere to all the terms and conditions associated with receipt of the money, which may include reimbursing the government (with interest). If the business fails to adhere to the terms and conditions associated with the lending of the money, community 214 may hold such failure against the business in regards to reputation.

Community 214 may value a business/company treating people fairly or equitably. Continuing the above example, if the business had a history of engaging in proactive behavior (e.g., engaging in a clean-up) when an oil spill impacted important financial constituents, but otherwise neglecting spills when the economic effects are less, community 214 may hold such discriminating decision making against the business with respect to the business' reputation in the community.

Community 214 may value a business/company getting involved in community affairs. For example, community 214 may expect the business to lend (financial) support to a community clean-up/trash pick-up by helping to print posters or advertisements advising of the clean-up. Community 214 may also expect the business to volunteer man-hours actually picking up the trash (e.g., community 214 may expect a number of associates from associate class 208 to participate). If the business fails to engage in community affairs, or if the extent of the business' involvement in those affairs is limited (or perceived as insincere), it may be held against the business with respect to the business's reputation in the community.

FIG. 2 includes a shareholders class 220. Shareholder class 220 may include stock or certificate holders of a business/company. In some embodiments, shareholder class 220 may include analysts, ratings agencies, or any other entity or association responsible for determining or undertaking an evaluation of a business/company.

Shareholder class 220 may value return on investment. For example, if a business/company has historically demonstrated positive returns on investments, the business may enjoy a good reputation with shareholders 220. Conversely, if the business has performed inconsistently in the past or has engaged in questionable business ventures, shareholders 220 may hold such practices against the business with regard to business reputation, which may translate into a reduced share price in some embodiments.

Shareholder class 220 may value earnings growth associated with the business. For example, shareholders 220 might not be content with simply positive rates of return on investment. Rather, shareholders 220 may expect a business to grow by expanding or by seeking out new business opportunities. Failure on the part of the business to achieve such growth may be reflected in shareholder 220 discontent with respect to the business's reputation.

Shareholder class 220 may emphasize corporate governance. For example, shareholders 220 may closely examine financial statements, reports prepared in advance of shareholder meetings, and statements made to news media outlets for completeness and accuracy. If the business fails to properly disclose all material information available to it, shareholders 220 may hold such failures against the business's reputation.

FIG. 2 includes a regulator class 226. Regulator class 226 may include local, state, and/or federal governmental agencies or organizations (e.g., the (U.S.) Securities and Exchange Commission (SEC)), or any entity or organization responsible for ensuring that a business/organization adheres to established (by-)laws, rules, and regulations.

Regulator class 226 may value a business/company adhering to regulations, whether those regulations are established by third parties (e.g., congressional legislation) or whether those regulations are established by the business itself (e.g., company by-laws). For example, if a business engages in unethical dealings with respect to shares or certificates of stock, the SEC may hold such practices against the business in regards to reputation because the SEC might have to devote scarce time and resources dealing with the business.

Regulators 226 may value transparency with respect to the business's dealings/practices. For example, U.S. securities laws prohibit the practices of insider trading, wherein a person trades a security while in possession of material nonpublic information in violation of a duty to withhold the information or refrain from trading. Failure on the part of a business to adhere to insider trading laws may harm the business's reputation with regulators 226. Indeed, regulators 226 may be forced to examine future dealings of the business with increased scrutiny as a result.

FIG. 2 includes a partner class 232. Partner class 232 may include those persons or entities that provide support to a business/company. For example, a referral service may team up with the business/company in such a way that the referral service refers potential clients to the business/company, and the business/company gives a portion of any proceeds earned to the referral service in return. Alternatively, or additionally, partner class 232 may include customers, vendors, and suppliers of the business/company.

Partner class 232 may value financial stability with respect to a business/company. For example, a supplier of raw materials may want to be sure that when shipping the materials, that the business is solvent and will be able to pay for any materials received. As such, in some embodiments, partners 232 may hold risky investment strategies against the business when it comes to formulating or assessing the business's reputation.

Partner class 232 may value management of operations. Continuing the above example related to a supplier shipping raw materials, if the supplier ships raw materials to the business for purposes of allowing the business to produce finished goods, the supplier may expect the business to employ an educated or qualified work force. The supplier may also expect the business to adhere to a consistent production process and schedule. Indeed, if defects with respect to the finished goods are perceived by the consuming public, the consuming public might suspect that the raw materials were (at least partially) responsible for the defects, and as such, the supplier's reputation could be harmed. Failure on the part of the business to adequately staff/manage its operations may result in harm to the business's reputation from the perspective of the supplier or partner class 232.

Partners 232 may emphasize volume of transactions. Continuing the above example, if the business has a large quantity of highly customized and expensive tool sets for manufacturing the finished goods, the supplier may hold it against the business if the volume of finished product produced by the business is low. Similarly, if the volume of transactions is too large (e.g., the business is outputting excessive amounts of finished product), the supplier may perceive the inflated production levels as potentially reducing the potential profits associated with the raw materials, thereby hurting the economic interest of the supplier. As such, the supplier/partners 232 might expect the business to produce an optimal amount or quantity of finished product. Any deviation from that optimal amount may be held against the business in regards to its reputation with partners 232.

While shown as discrete entities in FIG. 2, it is understood that a person may fall within any number of stakeholder classes. For example, a person that is a member of associate class 208 may also be a member of shareholder class 220 (e.g., an employee may own shares or stock certificates of the company she works for). Additionally, the expectations or characteristics of the various stakeholder classes described herein may be shared across stakeholder classes in any combination.

Stakeholder classes, in addition to those illustrated in FIG. 2, may be included in some embodiments. For example, the media, politicians, labor/interest groups, competitors, NGOs, and social media may constitute their own separate stakeholder classes in some embodiments. In other embodiments, the media, politicians, labor/interest groups, competitors, non-governmental organizations (NGOs), and social media may be lumped into one or more of customers 202, associates 208, community 214, shareholders 220, regulators 226, and partners 232, as appropriate.

Figure 3:
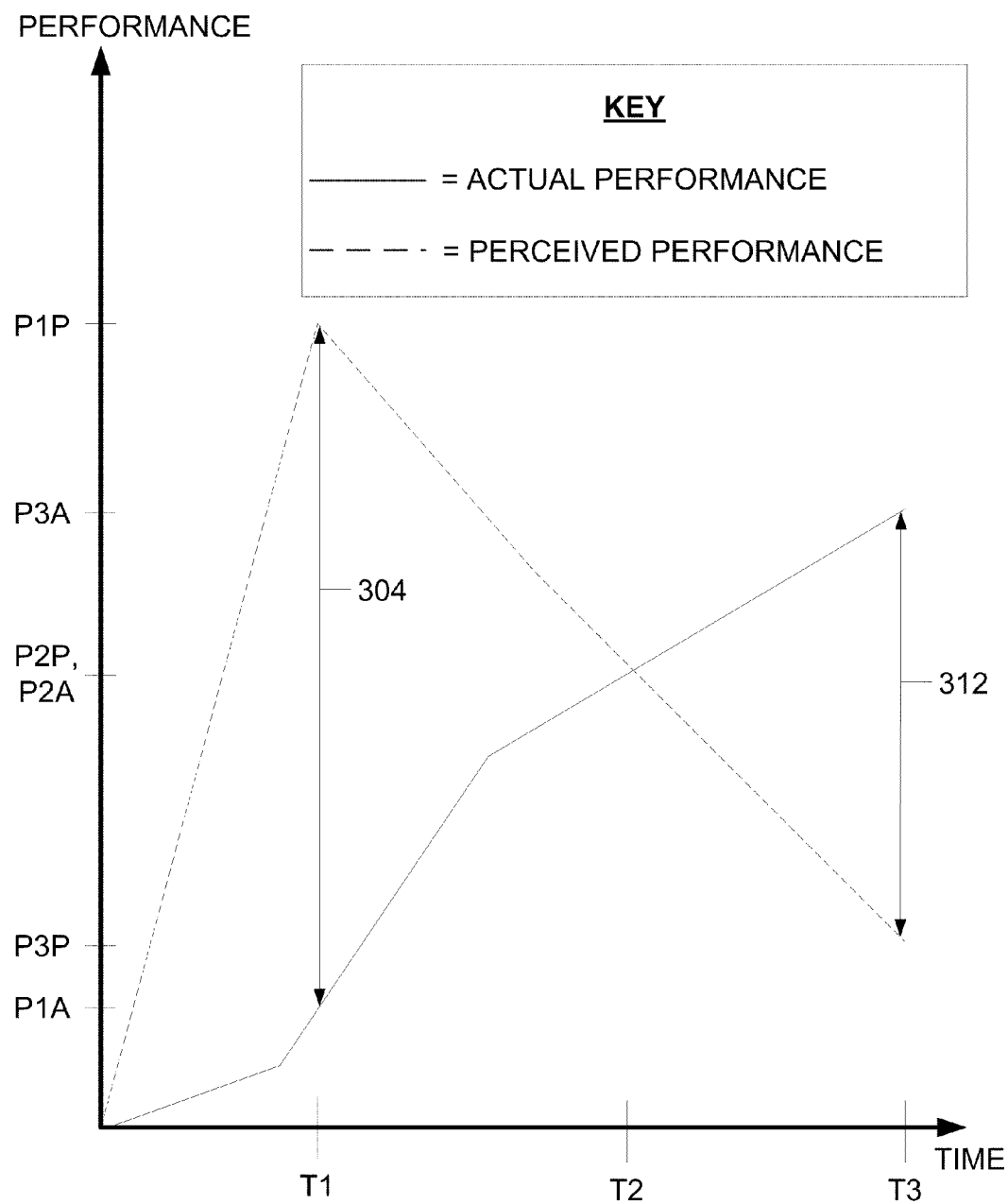
FIG. 3 illustrates a graph for determining risk in accordance with one or more aspects of the disclosure.

FIG. 3 illustrates a graph for determining risk in accordance with one or more aspects of the disclosure. For example, a business/company may determine the chances that the business/company fails to meet the expectations of the stakeholder classes discussed above with respect to FIG. 2. Specifically, FIG. 3 demonstrates a plot of business/company performance over time, in terms of both stakeholder perception (denoted by the broken line) and actual performance (denoted by the solid line).

Referring to FIG. 3, at a time T1, the actual performance (denoted by point P1A) lags the perceived performance (denoted by point P1P). The difference between two performance points represents the magnitude or degree of risk that the business is exposed to. For example, at time T1, the difference in performance points is equivalent to P1P−P1A, and is represented by arrow 304. Risk is large when actual performance significantly lags perceived performance expectations. The relatively large disparity between perceived and actual performance at time T1 in FIG. 3 could be brought about for any number of reasons. For example, a business may fail to communicate a defect in its manufacturing process to the stakeholder classes, such that the stakeholder classes continue to hold the business in high regard, while the actual product being produced by the business is rife with shortcomings.

At time T2, the perceived performance (P2P) and actual performance (P2A) are approximately equal. Thus, relative to time T1, the exposure of the business to risk has been substantially reduced or eliminated.

As shown in FIG. 3, relative to time T1, at time T2 the perceived performance of the business is lower (e.g., the perceived performance decreased from P1P at time T1 to P2P at time T2). Such a change may be brought about as a result of negative communication. If the business advises the public or stakeholder classes of a defect in its manufacturing process at or shortly after time T1, the stakeholder classes may have a diminished perception (denoted by P2P) of the business's performance at a later time T2, relative to their perception at time T1 (denoted by P1P), even if the defect was immediately fixed and actual performance increased as a result.

Similarly, as shown in FIG. 3, relative to time T1, at time T2 the actual performance of the business is higher (e.g., the actual performance increased from P1A at time T1 to P2A at time T2). Such a change may be brought about as a result of increased (actual) performance. Continuing the above example, if the business learns of the defect in its manufacturing process at or shortly after time T1, and takes corrective action thereafter to mitigate its effects, the actual performance of the business may increase based on the corrective action taken.

As shown in FIG. 3, at time T3, actual performance (denoted by P3A) exceeds perceived performance (P3P) by an amount equal to P3A−P3P (and denoted by arrow 312). When actual performance exceeds perceived performance, the business has a risk margin equal to the magnitude of the difference 312. Similar to the gap 304 described above with respect to time T1, gap 312 may occur as a result of an information inconsistency. For example, at time T3, stakeholder classes may believe that the business failed to cure the defects associated with its manufacturing process, despite the fact that the business cured such defects at or shortly after time T1.

The business could attempt to close the gap at time T3 by increasing communication efforts (thereby increasing the value of stakeholder perception). Such a gap closing may result in an increase in a stock or share price associated with a certificate traded on a market exchange. Alternatively, the business could simply allow the gap to exist, and enjoy the benefits that the gap affords. For example, the gap provides for risk mitigation margin with respect to defects unknown to the business at that time. Still further, the business could seek to reduce actual performance to close the gap. For example, the business could switch to less costly manufacturing or processing techniques.

The plot of performance versus time shown in FIG. 3 is merely illustrative, and it is understood that plots used in actual practice may differ depending on attendant circumstances and environmental factors. In some embodiments, plots similar to the one shown in FIG. 3 may be constructed for each of the stakeholder classes described above in conjunction with FIG. 2. In such a manner, increased resolution with respect to each stakeholder class may be obtained relative to an aggregate plot such as the one shown in FIG. 3.

FIG. 4 illustrates a diagram of risk categories in accordance with aspects of the disclosure. The risk categories may include categories of risk that are perceived to be material to a business or company's reputation with the stakeholder classes described above in conjunction with FIG. 2.

As shown in FIG. 4, one risk category that may be considered is non-compliance with regulations 402. Category 402 may include non-compliance with respect to rules, regulations, by-laws, laws, or any other governing policies or conventions. Non-compliance may be the result of rapid changes in regulation (e.g., due to changes relating to foreign trade) or an increasingly unstable economic environment. Non-compliance may also be the result of a change in ownership or control (e.g., a governmental take-over), economic protectionism, changes to (foreign) trade regulations, or additions of regulations requiring reporting or transparency for plans for external suppliers.

FIG. 4 includes security/privacy breaches category 408. As discussed above, stakeholder classes may expect a business to hold (personal) information in confidence, and a failure on the part of the business to do so may reflect poorly on the business when it comes to reputation. For example, a privacy breach could result in a customer's trade secrets being exposed. The customer might not engage in dealings with the business in the future responsive to the breach, and other potential customers may refrain from dealing with the business should they learn of the breach. Security breaches may be intensified due to deteriorating economic conditions in remote locations, unauthorized access to a network, bribery of employees or officials, and the like. In response to a security/privacy breach, a business may suffer reputational risk as a result of media coverage of the event, or a perception that the security breach has a high probability of occurring again.

FIG. 4 includes lack of quality category 414. Lack of quality may be reflected in a failure on the part of the business to produce a functional product. That assessment may be determined on an objective basis with respect to the product (e.g., the product works, or the product does not work). Alternatively, or additionally, the assessment may take place based on the product's functionality relative to other similar, competitive or substitute products available in the market place. Other standards may be applied to determine whether a quality product has been produced (e.g., does the product conform to quality control standards, is the product produced in an environmentally friendly way, is the product shipped according to production schedules, and the like). Lack of quality with respect to a product may be brought about by increased turnover rates of external suppliers in terms of employees in labor markets, increased stress levels of employees or clients, and the like. In response to a lack of quality, a business may suffer reputational risk as a result of media coverage or internal or customer complaints.

FIG. 4 includes a poor crisis management category 420. Crises may include any number of events, such as environmental disasters, war, destruction of raw materials or manufacturing facilities, illness, the plague, and the like. Crises may be brought about naturally (e.g., an act of God), as a result of political unrest, terrorism, and the like. Failure on the part of officials to respond to the crisis in a timely and sensitive manner may result in reputational harm to the business. Media coverage, and a perception that the business is ill-equipped to handle a future crisis may result in further reputational harm.

FIG. 4 includes a failure to hit targets category 426. Category 426 may be assessed on the basis of any number of objective factors/measures, including production volumes, revenues, profits, lost markets, and the like. Subjective factors may also be included, and may be based on consumer feedback, surveys, and the like. Events such as media coverage and acceptance of (governmental) assistance may serve to increase reputational risk.

FIG. 4 includes a poor associations category 432. Poor associations 432 may result from a business dealing with suppliers or customers that have poor standing among the stakeholder classes. Reputational risk associated with poor association category 432 may be brought about as a result of an economic deterioration in external supplier locations or as a result of more stringent regulations being applied to the suppliers and/or customers of the business. Events such as media coverage and customer impact with respect to ethics breaches may serve to increase reputational risk.

FIG. 4 includes a failure to address issues of public concern category 438. Public concern category 438 may result from a deteriorating job or economic environment, a need for taxpayer funding to stabilize the business, or even nationalization of the business. Events such as media coverage, official testimony, additional or more stringent regulations with respect to business practices, and the like may serve to increase reputational risk.

FIG. 4 includes a labor unrest category 444. Labor unrest may result from a deteriorating jobs picture, a conclusion/termination of a labor contract, or the like. Events such as media coverage and labor union campaigns and protests may serve to increase reputational risk. For example, a perception may exist that the business is indifferent to its employees' hardship.

In terms of assessing risk with respect to the risk categories discussed above, various weights may be applied to each event within each risk category, and a likelihood of the event occurring may be assigned. A summation of the products of (e.g., the multiplications of) the weight and the likelihood for each event within the risk category results in the overall risk likelihood for the category.

As an example, as described above with respect to lack of quality category 414, four events were identified that may impact risk with respect to lack of quality: (1) increased external supplier turnover rates in terms of employees in labor markets, (2) increased stress levels of employees or clients, (3) media coverage and (4) internal or customer complaints. The business may apply a weight of 40%, 30%, 20%, and 10% to events (1)-(4), respectively, with the weights adding to 100% (e.g., 40%+30%+20%+10%=100%) and each of the weights reflecting the perceived relative significance the event would have on the lack of quality category 414 were the event to occur, thereby serving as a measure of the severity or impact of the event occurring.

The business may also assign a numeric value representing the likelihood of each event occurring. The assignment may take place in conjunction with a normalized scale (e.g., a scale of 0 to 10, where 10 represents the greatest likelihood of the event occurring (e.g., the event will occur with certainty), 0 represents the lowest likelihood of the event occurring (e.g., the event will not occur, with certainty), and the values/points in between representing an intermediate likelihood of each event occurring). Thus, continuing the above example, the business may assign likelihood values of 2, 5, 6, and 9 to events (1)-(4), respectively.

Continuing the above example, the summation of the products of the respective weights and likelihood values is: (40%*2)+(30%*5)+(20%*6)+(10%*9)=0.8+1.5++1.2+0.9=4.4, with the result being the computed risk likelihood. Thus, in this example, on a scale of 0 to 10, a computed risk likelihood of 4.4 exists that an event will occur that will negatively reflect on the business with respect to lack of quality (category 414).

In some embodiments, the likelihood values may mean different things when taken in context with respect to risk categories or stakeholder classes. Thus, for example, a likelihood value of 2 with respect to lack of quality category (414) and the impact on the customer stakeholder class (202) may mean that a reputational failure of this type would have a negative impact on the customer class, with effects lasting for more than 3 months. A likelihood value of 2 with respect to labor unrest category (444) and the impact on the associate stakeholder class (208) may mean that a reputational failure of this type would affect associates but not cause them to take any substantive action (e.g., striking, a work stoppage/walkout, etc).

In some embodiments, once a risk likelihood value is computed for each of the risk categories (e.g., categories 402-444 of FIG. 4), a severity value may be determined and assigned for each of the risk categories with respect to each of the stakeholder classes (e.g., stakeholder classes 202-232 of FIG. 2). A severity value may represent an average severity of the risk category with respect to a given stakeholder class. Thus, in the examples provided, given six stakeholder classes (202, 208, 214, 220, 226, and 232) and eight risk categories (402, 408, 414, 420, 426, 432, 438, and 444), there are forty eight (48) (i.e., 6×8) possible severity values that may be determined and/or assigned.

Each of the severity values may represent an average severity of the negative impact on each stakeholder within a given stakeholder class given the computed risk likelihood of a given risk category. Similar to the above values, the severity values may be assigned on a basis of a normalized range to promote consistency in comparison between the various values. For example, a severity value of 10 may indicate that an event occurring within a given risk category will have a significant or substantial impact on the stakeholder class, a severity value of 0 may indicate that an event occurring within the given risk category will have a negligible impact on the stakeholder class, and intermediate values may be indicative of a moderate impact on the stakeholder class. Other ranges of severity values may be used in some embodiments.

A product of the severity value for a given stakeholder class with the computed risk likelihood value for a given risk category may generate a risk score for the given stakeholder class with respect to the given risk category. For purposes of illustration, continuing the above example related to a computed risk likelihood of 4.4 existing that an event will occur that will negatively reflect on the business with respect to lack of quality (category 414), should an event within lack of quality category 414 occur: the severity with respect to customer stakeholder class 202 may be determined to be 1, the severity with respect to associates stakeholder class 208 may be determined to be 2, the severity with respect to community stakeholder class 214 may be determined to be 3, the severity with respect to shareholder stakeholder class 220 may be determined to be 9, the severity with respect to regulators stakeholder class 226 may be determined to be 8, and the severity with respect to partners stakeholder class 232 may be determined to be 7. Thus, with respect to customer stakeholder class 202, a risk score may be computed as 4.4×1=4.4. With respect to associates stakeholder class 208, a risk score may be computed as 4.4×2=8.8. With respect to community stakeholder class 214, a risk score may be computed as 4.4×3=13.2. With respect to shareholder stakeholder class 220, a risk score may be computed as 4.4×9=39.6. With respect to regulators stakeholder class 226, a risk score may be computed as 4.4×8=35.2. With respect to partners stakeholder class 232, a risk score may be computed as 4.4×7=30.8.

In terms of determining the weights and likelihood values to assign to each event within a risk category, and the severity levels assigned to each stakeholder class with respect to each risk category, input may be sought from any number of people, processes, or the like. For example, a business may formulate a baseline enterprise perspective by surveying human resources personnel, government policy makers, and the like. Input may also be sought from business models, historical performance perspectives, and the like. Once the baseline enterprise perspective is formulated, the perspective may be modified to accommodate input from line of business processor owners or personnel that would be forced to deal with an event or have particular experiences in handling an event type. For example, line of business process owners may provide perspective and insight into whether a process in question is subject to any additional likelihood that an event will occur (or for that matter, the weight or severity that would be associated with the event occurring). Thus, in some embodiments, one or more of the weights, the likelihood values, the product (multiplication) of the weights and likelihood values for each event, the summation of the products of the respective weights and likelihood values for each risk category, and the severity levels for each stakeholder class associated with each of the risk categories may be modified (e.g., weighted) to take into account the line of business process owner's perspective. Line of business process owners may also suggest mitigation strategies for coping with potential risk issues/problems.

By computing the summation of the products of the respective weights and likelihood values for each of the risk categories demonstrated in FIG. 4, a business may determine which risk categories pose the greatest threat to the business's reputation. In this manner, the business can allocate resources or take corrective action to address those categories that pose the biggest problem/challenge. Moreover, by determining and assigning a severity to each risk category with respect to each of the stakeholder classes, risk may be pinpointed to the lowest levels of abstraction.

In some embodiments, in addition to weighting the events within a risk category, the risk categories themselves may be weighted. For example, a particular business (e.g., a financial services institution) may be more susceptible to reputational risk originating from security/privacy breaches 408 than from labor unrest 444. Accordingly, the business's/financial services institution's model may more heavily weight the risk computed for the security/privacy breaches category 408 relative to the labor unrest category 444 in a subsequent risk computation step.

In the foregoing example, it is understood that the likelihood value scale can be modified or adjusted, depending on the type of resolution that may be needed in a particular context or environment. For example, instead of using a scale from 0 to 10, a scale from 1 to 4, or 0 to 100, may be used in some embodiments.

Figure 5:
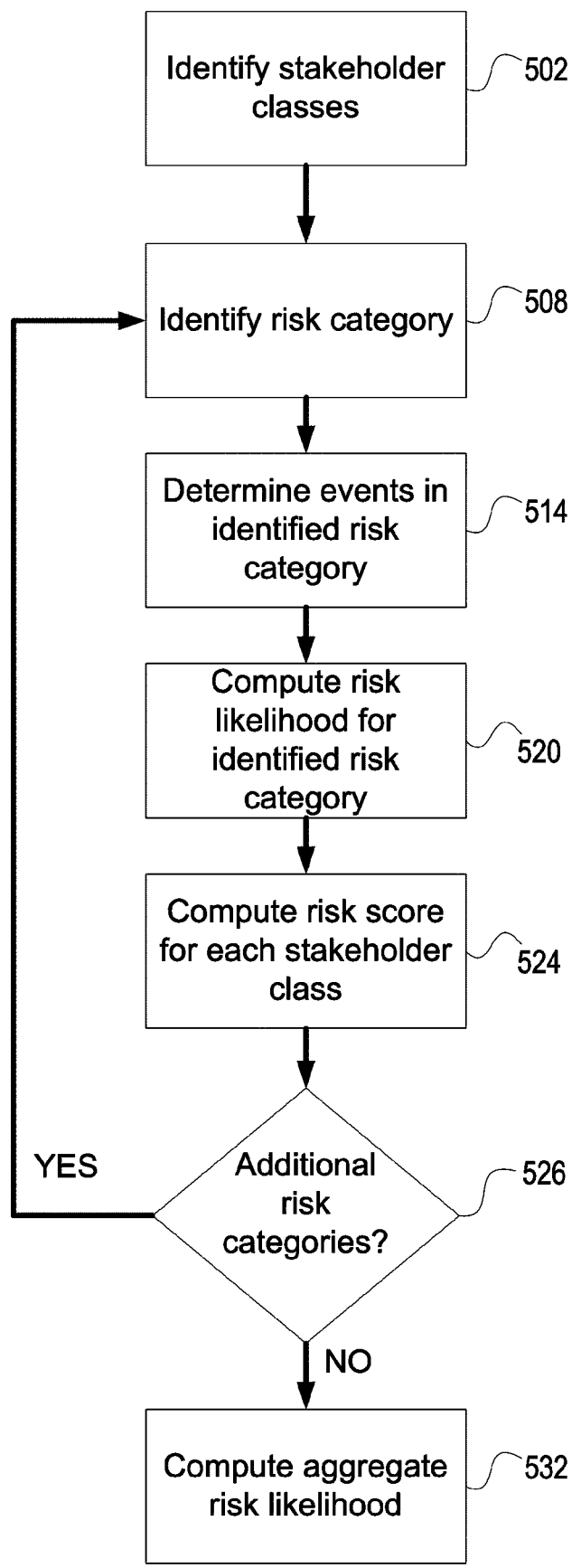
FIG. 5 illustrates a method for calculating risk in accordance with one or more aspects of the disclosure.

FIG. 5 illustrates a method for calculating risk in accordance with one or more aspects of the disclosure. In step 502, stakeholder classes are identified. The stakeholder classes may correspond to one or more of the stakeholder classes described above in conjunction with FIG. 2 (e.g., stakeholder classes 202-232).

In step 508, a risk category may be identified. The risk category may correspond to one of the risk categories described above in conjunction with FIG. 4 (e.g., risk categories 402-444).

In step 514, events in the risk category identified in step 508 may be determined. For each determined event, a weight and a likelihood value may be assigned.

In step 520, risk likelihood for the risk category identified in step 508 may be computed. The computation may be based on a summation of the products of the respective weights and likelihood values determined for each event in step 514. In some embodiments, alternative formulas or algorithms may be used to compute the risk likelihood.

In step 524, a risk score may be computed for each stakeholder class based on the risk likelihood computed in step 520. For example, for each stakeholder class, a risk score may be computed as a product of the risk likelihood computed in step 520 and a determined and assigned severity value for the given stakeholder class.

In step 526, a determination may be made whether there are additional risk categories for which to compute a risk likelihood. If there is/are (e.g., the "Yes" path is taken out of block 526), a new risk category is identified in block 508 and the process repeats. Otherwise, if there are no additional risk categories (e.g., the "No" path is taken out of block 526), the method may proceed to step 532, where an aggregate risk likelihood may be computed based on the risk likelihood(s) computed in step 520. As discussed above, the risk likelihoods computed for each identified risk category in step 520 may in turn be weighted when computing the aggregate risk likelihood in step 532.

Steps 508-532 may be conducted for each stakeholder class identified in step 502. Accordingly, a model may be constructed indicating an aggregate risk likelihood the business faces with respect to each stakeholder class, and a risk likelihood for each identified risk category with respect to each stakeholder class. As discussed above, this information may enable the business to allocate scarce resources to address those areas of risk management that are computed to be of greatest concern.

FIG. 6 illustrates a generated heatmap 600 that may be used in accordance with one or more aspects of the disclosure. Heatmap 600 includes the reputation risk categories 402-444 described above in conjunction with FIG. 4. As used herein, a heatmap refers to an output tabulation of reputation risk. As shown with respect to heatmap 600, a heatmap may include color-codings, shadings, patterns or the like for purposes of easily distinguishing or highlighting risk or risk related data provided in the heatmap.

Heatmap 600 includes a trend indicator (TR) for purposes of demonstrating a trend with respect to computed risk. For example, an upward facing arrow (such as shown with respect to security/privacy breaches 408, failure to hit targets 426, and failure to address issues of public concern (438)) may indicate that risk is increasing over a given time frame. Similarly, a downward facing arrow (such as shown with respect to poor crisis management (420), and labor unrest (444)) may indicate that risk is decreasing over a given time frame. A sideways facing arrow (such as shown with respect to non-compliance with regulations (402), lack of quality (414) and poor associations (432)) may indicate no (significant or substantial) variation in risk over a given time frame. Thresholds may be applied to determine in which direction to orient the arrow.

In some embodiments, rather than simply showing an arrow, a numeric may be displayed in conjunction with TR. For example, a positive number may be indicative of increasing risk, a negative number indicative of decreasing risk, and a zero value indicative of no change. A computation of the first derivative of the risk may be used to determine the appropriate numeric to display.

In some embodiments, graphic enhancements may be used to indicate the magnitude or degree of change over a given time period. For example, in some embodiments, the steepness or angle a TR arrow makes with respect to a normal or axis may be used. In some embodiments, the size or intensity associated with the arrow may be varied to indicate the degree of change. In some embodiments, color-coding schemes may be used. While discussed with respect to TR, such enhancements may be used with respect to the other data informational fields included in a heatmap.

Heaptmap 600 includes a likelihood value column (LH). The LH values may correspond to the (average of the) likelihood values assigned to given events within each of the risk categories (402-444). For example, as discussed above with respect to non-compliance with regulations category 402, events that may be included within category 402 include (1) non-compliance with respect to rules, regulations, by-laws, laws, or any other governing policies or conventions, (2) rapid changes in regulation, (3) a change in ownership or control, (4) economic protectionism, (5) changes to trade regulations, and (5) additions of regulations requiring reporting or transparency for plans for external suppliers. With respect to the referenced five events, the events may have associated LH values of 1, 3, 4, 1, and 1, respectively. Thus, the average likelihood of the five events is (1+3+4+1+1)/5=2.

In FIG. 6, the scale used for the LH values ranges from '1' to '4'. A '1' may mean likely not to occur in normal circumstances, a '2' may mean could occur at some point in time, a '3' may mean will probably occur in most circumstances, and a '4' may mean is expected to occur in most circumstances, for example. As described above, in some embodiments, coloration or shading techniques may be used to distinguish the different values included in the data fields. For example, as shown in heatmap 600, LH values of ' 1' might not include any shading or pattern, LH values of '2' may include a diagonal pattern, LH values of '3' may include a (horizontally-and-vertically oriented) cross-hatch pattern, and LH values of '4' may include a diagonally-oriented cross-hatch pattern. Of course, other shading or pattern techniques (or any other technique for emphasizing data) may be used.

Heatmap 600 includes a weight value column (WGT). The WGT values may correspond to the (average of the) weight or severity values assigned to given events within each of the risk categories (402-444). Thus, referring to the five events identified above with respect to non-compliance with regulations category 402, the five events may have associated weight values of 0.3, 0.5, 0.1, 0.2, and 0.4, respectively. As such, the average weight value of the weights is (0.3+0.5+0.1+0.2+0.4)/5=0.3. One of skill in the art will appreciate that the weight values correspond to a fractional share and thus may range from 0 (meaning no impact) to 1 (meaning severe impact).

Similar to the coloring/sharing conducted with respect to the LH field, coloration/shading may be applied to the WGT fields for purposes of emphasizing or differentiating the various WGT values. As shown in FIG. 6, WGT values ranging from 0 to 0.25 do not include any pattern, WGT values ranging from 0.26 to 0.50 include a diagonal pattern, WGT values ranging from 0.51 to 0.75 include a (horizontally-and-vertically oriented) cross-hatch pattern, and WGT values ranging from 0.76 to 1 include a diagonally-oriented cross-hatch pattern. In some embodiments, different numbers of WGT ranges and patterns/colorations may be used depending on the resolution desired. Moreover, the ranges do not have to be uniform. For example, smaller ranges may be used at higher WGT values to provide for increased differentiation with respect to those categories that will likely have a significant impact on a business using the heatmap.

Heatmap 600 includes a risk number column (Risk #). Risk # values may be computed by taking the product of (e.g., multiplying) the values in LH with the corresponding values in WGT to arrive at a category risk likelihood value for each of the risk categories (402-444). Thus, for example, with respect to non-compliance with regulations category 402, the product of the LH value of 2 and the WGT value of 0.3 is 0.6 as shown. In some embodiments, alternative formulas or algorithms may be used to compute the Risk # values.

Risk # values may be used to determine the amount of risk a business faces with respect to each of the risk categories, and may be used to formulate risk mitigation strategies. While not shown in heatmap 600, in some embodiments the Risk # values may be colored, shaded, or include a pattern in a manner similar to the LH and WGT fields described above for purposes of differentiating the values in the Risk # column.

Heatmap 600 includes stakeholder class columns 202'-232', corresponding to the stakeholder classes 202-232 described above in conjunction with FIG. 2. In heatmap 600, each stakeholder class column 202'-232' has a corresponding stakeholder risk score for each of the risk categories (402-444). The stakeholder risk values may be computed for each stakeholder class in a manner similar to that discussed above with respect to the FIGS. 4-5 and the Risk # column of heatmap 600. More specifically, a risk likelihood value (e.g., the value in Risk # column of heatmap 600) for each risk category (e.g., each row of heatmap 600 corresponding to risk categories 402-444) may be multiplied by a determined and assigned severity value associated with each stakeholder class (corresponding to stakeholder classes 202-232 of FIG. 2). Thus, for example, with respect to non-compliance with regulations category 402, a severity value (on a scale of 0 to 4) may be determined and assigned for each of the stakeholder classes 202-232. More specifically, the severity value may be: 0.50 for customers 202, 0.67 for associates 208, 0.83 for community 214, 1.17 for shareholders 220, 1.33 for regulators 226, and 1.50 for partners 232 with respect to category 402. The product of the risk likelihood value (0.6) and each of the severity values for each of the stakeholder classes may result in the values of 0.3, 0.4, 0.5, 0.7, 0.8, and 0.9 as shown in the row of heatmap 600 corresponding to category 402.

Similar calculations may be performed to complete the cells corresponding to the intersection of rows 402-444 and columns 202'-232'.

While not shown in heatmap 600, in some embodiments a heatmap may display the severity values for each of the risk categories 402-444 and stakeholder classes 202-232 (or 202'-232').

As such, heatmap 600 provides both a risk likelihood value (as indicated in the Risk # column), as well as the resolution to identify a risk score for each of the stakeholder classes with respect to each risk category. In a manner similar to the LH and WGT fields described above, coloration, shading, or the inclusion of a pattern with respect to stakeholder related fields 202'-232' may be provided for purposes of distinguishing or emphasizing different risk scores. For example, as shown with respect to heatmap 600, risk scores ranging from 0 to 1.0 might not be shaded, risk scores ranking from 1.1 to 2.0 may include a diagonal pattern, risk scores ranging from 2.1 to 3.0 may include a (horizontally-and-vertically oriented) cross-hatch pattern, and risk scores ranging from 3.1 to 4.0 may include a diagonally-oriented cross-hatch pattern.

Other criteria may be used in some embodiments for determining which colors or patterns to include with respect to columns 202'-232'. For example, in some embodiments, the highest level risk score associated with the stakeholder classes may be highlighted with respect to each of the risk categories. Thus, with respect to the non-compliance with regulations category 402, the partner stakeholder class column 232' may be highlighted because column 232' has a risk score of 0.9, which is greater than any other risk score in the row corresponding to non-compliance with regulations 402. Similarly, with respect to failure to hit targets category 426, the shareholder stakeholder class column 220' could be highlighted because column 220' has a risk score of 3.8, which is greater than any other risk score in the row corresponding to failure to hit targets 426. As yet another example, the highest score in each of columns 202'-232' may be highlighted in some embodiments. Thus, with respect to customers 202', the score of 3.6 (corresponding to risk category failure to address issues of public concern 438) may be highlighted because 3.6 is greater than any other score in column 202'. Similarly, with respect to column 220', the score of 3.8 (corresponding to the failure to hit targets category 426) may be highlighted because 3.8 is greater than any other score in column 220'. Options may be presented to a user to select criteria to apply for purposes of highlighting, shading, coloring, pattern inclusion, etc. For example, a drop down menu, a list of radio buttons or check-mark boxes, and the like may be presented in a graphical display for purposes of choosing which data emphasis techniques to apply.

A heatmap may include information in addition to that shown with respect to heatmap 600 of FIG. 6. For example, a heatmap may include a current environmental outlook that aggregates risk across categories (similar to step 532 of FIG. 5). For example, the aggregated risk may be summarized as one of "good," "fair," "poor," and "bad."

Similarly, a heatmap may provide a forecast based on the current risk values, trends, historical performance, and the like. For example, a forecast status may be presented in a heatmap, wherein the forecast status takes on a status value of "good," "fair," "poor," or "bad." A degree of confidence may be associated with the forecast status, providing an indication of the likelihood that the forecast is accurate. Historical performance may be used in the forecast, particularly where events tend to be repeatable or where the products involved are cyclical (e.g., seasonal) in nature. In conjunction with analyzing historical performance data, curve or function fitting may be performed to assign a mathematical formula, equation, or relationship to the risk. A second derivative computation of the risk may be conducted to determine risk maxima or minima.

A generated heatmap may be output using one or more tools, and may take on one or more formats. For example, a heatmap may be output as a spreadsheet, a table in a word processing document, an e-mail, a text message, an instant message, a fax/facsimile, and the like.

Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment, an entirely firmware embodiment, or an embodiment combining software, firmware and hardware aspects. The functionality may be resident in a single computing device, or may be distributed across multiple computing devices/platforms, the multiple computing devices/platforms optionally being connected to one another via one or more computing networks. In addition, various signals representing data or events as described herein may be transferred between a source and a destination in the form of electromagnetic waves traveling through signal-conducting media such as metal wires, optical fibers, and/or wireless transmission media (e.g., air and/or space).

As described herein, the various methods and acts may be operative across one or more computing servers and one or more computing networks. The functionality may be distributed in any manner, or may be located in a single computing device (e.g., a server, a client computer, and the like). As discussed herein, real-time (or substantially real-time) access to risk related information may be obtained across various risk categories and stakeholder classes. Thus, business officials may be better equipped to make decisions, such as allocating scarce resources, to address or mitigate risk.

As described herein, the methodological acts and processes may be tied to particular machines or apparatuses. For example, one or more computers may include one or more processors and memory storing instructions, that when executed, perform the methodological acts and processes described herein. The one or more processors may be operative on computer data, and may be referred to as data processor(s). In some embodiments, a risk analysis computer and/or server may be used. Furthermore, the methodological acts and processes described herein may perform a variety of functions including transforming an article (e.g., computer data) into a different state or thing (e.g., into a computation of risk based on a likelihood of occurrence and a weight or severity associated with such an occurrence, an identification of risk categories and stakeholder classes, and an output/display of a heatmap reflective of risk with various degrees of resolution). In some embodiments, the transformation may take place in accordance with a predefined algorithm or formula.

Aspects of the disclosure have been described in terms of reputational risk to a business/company. One skilled in the art will appreciate that those aspects may be adapted to accommodate different types or risk, and that the aspects may be applied to products, services, or a combination thereof. Furthermore, in some embodiments, additional or different risk categories may be used, and the number and organization of the stakeholder classes may be modified without departing from the scope and spirit of this disclosure.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. A computer-assisted method comprising:
a data processor identifying a plurality of risk categories stored in a computer memory;
the data processor identifying one or more events within each of the risk categories, the one or more events including a forecast of whether one or more performance expectations will be met;
the data processor assigning an event weight value and a likelihood value to each of the determined events, wherein the event weight value represents a severity of each of the determined events occurring and the likelihood value represents a likelihood of each of the determined events occurring;
the data processor computing a category risk likelihood value for each risk category by transforming each assigned event weight value and each assigned likelihood value into each category risk likelihood using a first predefined algorithm;
the data processor assigning a category weight value to each of the plurality of risk categories;
the data processor computing an aggregate risk value by transforming each assigned category weight value and each category risk likelihood value into the aggregate risk value using a second predefined algorithm;
the data processor identifying a plurality of stakeholder classes stored in the computer memory, the plurality of stakeholder classes including a least a first stakeholder class having a first performance expectation for a first risk category and a second stakeholder class having a second performance expectation for the first risk category, the second performance expectation being different from the first performance expectation;
the data processor determining and assigning a severity value to each of the stakeholder classes with respect to each of the risk categories, the severity value indicating a severity of a negative impact to a respective stakeholder class; and
the data processor computing a risk score identifying a risk to a reputation of an entity for each risk category with respect to each stakeholder class, the risk score including the severity value and the category risk likelihood, wherein the category risk likelihood for the first stakeholder class is determined, at least in part, on a forecast of whether the first performance expectation will be met and the category risk likelihood for the second stakeholder class is determined, at least in part, on a forecast of whether the second performance expectation will be met.

2. The method of claim 1, further comprising:
the data processor generating a graphical heatmap, the heatmap including the plurality of risk categories, an average likelihood value for the determined events within each of the risk categories, an average weight value for the determined events within each of the risk categories, the category risk likelihood values, the risk scores, and an indication of a trend associated with each of the category risk likelihood values,
wherein the indication of the trend associated with each of the category risk likelihood values is represented by an arrow, and
wherein at least one of coloring, shading, highlighting, and inclusion of a pattern is used to indicate a severity level corresponding to at least one of the average likelihood values, the average weight values, the category risk likelihood values, and the risk scores.

3. The method of claim 1, further comprising:
the data processor determining a trend associated with at least one of the risk categories.

4. The method of claim 3, further comprising:
the data processor forecasting risk with respect to at least one of the risk categories based on the corresponding computed risk likelihood value, the determined trend, and historical performance.

5. The method of claim 1, further comprising:
engaging a risk mitigation strategy to reduce at least one of the computed risk likelihood values.

6. The method of claim 5, wherein the risk mitigation strategy includes communicating with at least one stakeholder class, and wherein the corresponding computed risk likelihood value is reduced responsive to the communication.

7. An apparatus comprising:
a processor; and
a memory having stored thereon computer-executable instructions that, when executed by the processor, perform:
identifying a plurality of risk categories;
identifying one or more events within each of the risk categories, the one or more events including a forecast of whether one or more performance expectations will be met;
assigning an event weight value and a likelihood value to each of the determined events, wherein the event weight value represents a severity of each of the determined events occurring and the likelihood value represents a likelihood of each of the determined events occurring;
computing a category risk likelihood value for each risk category by transforming each assigned event weight value and each assigned likelihood value into each category risk likelihood using a first predefined algorithm;
assigning a category weight value to each of the plurality of risk categories;
computing an aggregate risk value by transforming each assigned category weight value and each category risk likelihood value into the aggregate risk value using a second predefined algorithm;
identifying a plurality of stakeholder classes, the plurality of stakeholder classes including a least a first stakeholder class having a first performance expectation for a first risk category and a second stakeholder class having a second performance expectation for the first risk category, the second performance expectation being different from the first performance expectation;
determining and assigning a severity value to each of the identified stakeholder classes with respect to each of the risk categories, the severity value indicating a severity of a negative impact to a respective stakeholder class; and
computing a risk score identifying a risk to a reputation of an entity for each risk category with respect to each stakeholder class, the risk score including the severity value and the category risk likelihood, wherein the category risk likelihood for the first stakeholder class is determined, at least in part, on a forecast of whether the first performance expectation will be met and the category risk likelihood for the second stakeholder class is determined, at least in part, on a forecast of whether the second performance expectation will be met.

8. The apparatus of claim 7, wherein the instructions include at least one instruction that, when executed, performs:
generating a graphical heatmap, the heatmap including the plurality of risk categories, an average likelihood value for the determined events within each of the risk categories, an average weight value for the determined events within each of the risk categories, the category risk likelihood values, the risk scores, and an indication of a trend associated with each of the category risk likelihood values,
wherein the indication of the trend associated with each of the category risk likelihood values is represented by an arrow, and
wherein at least one of coloring, shading, highlighting, and inclusion of a pattern is used to indicate a severity level corresponding to at least one of the average likelihood values, the average weight values, the category risk likelihood values, and the risk scores.

9. The apparatus of claim 7, wherein the instructions include at least one instruction that, when executed, performs:
engaging a risk mitigation strategy to reduce at least one of the computed risk likelihood values.

10. A non-transitory computer-readable medium having stored thereon executable instructions that, when executed, cause a risk analysis server to perform:
identifying a plurality of risk categories;
determining one or more events within each of the risk categories, the one or more events including a forecast of whether one or more performance expectations will be met;
assigning a weight value and a likelihood value to the determined events, wherein the weight value represents a severity of one of the determined events occurring and the likelihood value represents a likelihood of one of the determined events occurring;
computing a category risk likelihood value for each risk category by transforming the assigned weight values and the assigned likelihood values using a first predefined algorithm;
assigning a category weight value to each of the plurality of risk categories; and
computing an aggregate risk value by transforming each assigned category weight value and each category risk likelihood value into the aggregate risk value using a second predefined algorithm;
identifying a plurality of stakeholder classes, the plurality of stakeholder classes including a least a first stakeholder class having a first performance expectation for a first risk category and a second stakeholder class having a second performance expectation for the first risk category, the second performance expectation being different from the first performance expectation;
determining and assigning a severity value to each of the identified stakeholder classes with respect to each of the risk categories, the severity value indicating a severity of a negative impact to a respective stakeholder class; and
computing a risk score identifying a risk to a reputation of an entity for each risk category with respect to each stakeholder class, the risk score including the severity value and the category risk likelihood, wherein the category risk likelihood for the first stakeholder class is determined, at least in part, on a forecast of whether the first performance expectation will be met and the category risk likelihood for the second stakeholder class is determined, at least in part, on a forecast of whether the second performance expectation will be met.

11. The non-transitory computer-readable medium of claim 10, wherein the computation of at least one of the category risk likelihood values and the risk scores is based on a weighted summation.

12. A computer-assisted method comprising:
a data processor determining one or more events within each of a plurality of risk categories comprising non-compliance with regulations, security/privacy breaches, lack of quality, poor crisis management, failure to hit targets, poor associations, failure to address issues of public concern, and labor unrest, the one or more events including a forecast of whether one or more performance expectations will be met;
the data processor assigning an event weight value and a likelihood value to the determined events, wherein the event weight value represents a severity of one of the determined events occurring and the likelihood value represents a likelihood of one of the determined events occurring;
the data processor computing a category risk likelihood value for each risk category by transforming the assigned event weight values and the assigned likelihood values using a first predefined algorithm;
the data processor assigning a category weight value to each of the plurality of risk categories;
the data processor computing an aggregate risk value by transforming each assigned category weight value and each category risk likelihood value into the aggregate risk value using a second predefined algorithm;
the data processor identifying a plurality of stakeholder classes stored in the computer memory, the identified plurality of stakeholder classes including: customers, associates, community, shareholders, regulators, and partners, each stakeholder class having a performance expectation for each risk category, wherein a performance expectation for a first stakeholder class for a first risk category is different from a performance expectation for a second stakeholder class for the first risk category;
the data processor determining and assigning a severity value to each of the stakeholder classes with respect to each of the risk categories, the severity value indicating a severity of a negative impact to a respective stakeholder class;
the data processor computing a risk score identifying a risk to a reputation of an entity for each risk category with respect to each stakeholder class, the risk score including the severity value and the category risk likelihood, wherein the category risk likelihood for the first stakeholder class is determined, at least in part, on a forecast of whether the first performance expectation will be met and the category risk likelihood for the second stakeholder class is determined, at least in part, on a forecast of whether the second performance expectation will be met; and
the data processor generating a heatmap, the heatmap including the plurality of risk categories, an average likelihood value for the determined events within each of the risk categories, an average weight value for the determined events within each of the risk categories, the category risk likelihood values, the risk scores, an indication of a trend associated with each of the category risk likelihood values, a current environmental outlook, and a forecast status, wherein the indication of the trend associated with each of the category risk likelihood values is represented by an arrow, and wherein at least one of coloring, shading, highlighting, and inclusion of a pattern is used to indicate a severity level corresponding to at least one of the average likelihood values, the average weight values, the category risk likelihood values, and the risk scores.

13. The method of claim 12, wherein the current environmental outlook and the forecast status are each one of good, fair, poor, and bad.

14. The method of claim 12, wherein each arrow representative of the trend associated with each of the category risk likelihood values is oriented upward when the respective category risk likelihood value is increasing at a rate greater than a first threshold value, and wherein each arrow representative of the trend associated with each of the category risk likelihood values is oriented downward when the respective category risk likelihood value is decreasing at a rate greater than a second threshold value, and wherein each arrow representative of the trend associated with each of the category risk likelihood values is oriented horizontally when the respective category risk likelihood value is not increasing at a rate greater than the first threshold value and is not decreasing at a rate greater than the second threshold value.

15. The computer-assisted method of claim 1, wherein the first stakeholder class is a group of employees of the entity and the second stakeholder class is not associated with the entity.

16. The computer-assisted method of claim 1, wherein the performance expectations, including the first performance expectation and the second performance expectation, are performance expectations of the entity.

* * * * *